US009062731B2

(12) United States Patent
Boonpongmanee et al.

(10) Patent No.: US 9,062,731 B2
(45) Date of Patent: Jun. 23, 2015

(54) WATER COOLED BRAKE

(71) Applicant: Eaton Corporation, Cleveland, OH (US)

(72) Inventors: Thaveesak Boonpongmanee, Westlake, OH (US); Philip Simons, Lorain, OH (US); Brian Hukill, Brunswick, OH (US)

(73) Assignee: EATON CORPORATION, Cleveland, OH (US)

( * ) Notice: Subject to any disclaimer, the term of this patent is extended or adjusted under 35 U.S.C. 154(b) by 36 days.

(21) Appl. No.: 13/956,973

(22) Filed: Aug. 1, 2013

(65) Prior Publication Data

US 2013/0341136 A1    Dec. 26, 2013

Related U.S. Application Data

(63) Continuation-in-part of application No. 13/549,944, filed on Jul. 16, 2012, now Pat. No. 8,752,680, and a continuation-in-part of application No. 12/429,219, filed on Apr. 24, 2009.

(51) Int. Cl.
*F16D 65/853* (2006.01)
*F16D 55/36* (2006.01)
*F16D 121/04* (2012.01)

(52) U.S. Cl.
CPC .............. *F16D 65/853* (2013.01); *F16D 55/36* (2013.01); *F16D 2121/04* (2013.01)

(58) Field of Classification Search
USPC ....... 188/71.6, 264 CC, 264 D, 264 E, 264 F; 192/70.12, 113.3, 113.34, 113.35, 192/113.36
See application file for complete search history.

(56) References Cited

U.S. PATENT DOCUMENTS

| | | | |
|---|---|---|---|
| 3,047,105 A * | 7/1962 | Schwartz | 188/264 D |
| 3,572,477 A * | 3/1971 | Ewart | 188/264 D |
| 7,556,128 B2 * | 7/2009 | Mayberry et al. | 188/71.5 |
| 7,591,349 B2 * | 9/2009 | McConkie et al. | 188/71.6 |
| 8,752,680 B2 * | 6/2014 | Boonpongmanee et al. | 188/264 D |
| 2009/0065320 A1 * | 3/2009 | Culmer | 192/70.12 |
| 2009/0133974 A1 * | 5/2009 | Mayberry et al. | 188/71.4 |
| 2013/0180808 A1 | 7/2013 | McClintic | |

* cited by examiner

*Primary Examiner* — Christopher Schwartz
(74) *Attorney, Agent, or Firm* — Walker & Jocke

(57) ABSTRACT

A braking system includes at least one rotating disc and at least one brake disc. A brake disc wear plate is configured for retarding engagement with a rotating disc brake pad. Each brake disc has an annular coolant cavity associated with two inlet ports spaced apart 180° and two outlet ports spaced apart 180°. Each outlet port is spaced 90° from an adjacent inlet port. Each port leads to a respective radial channel. The channels are in open flow communication with each other. Inlet port coolant received into an inlet channel flows in both angular directions toward the outlet ports. Heated coolant gathered at an outlet channel is a mixture of coolant received from both inlet channels. Each inlet channel includes a stepped configuration to divert additional coolant to the outermost portion of the coolant cavity, which portion underlies the outermost (and hottest) portion of the wear plate.

20 Claims, 9 Drawing Sheets

WATER COOLED BRAKE

TECHNICAL FIELD

The present disclosure relates to disc brakes. More particularly, the present disclosure relates to internally, liquid-cooled disc brakes.

BACKGROUND OF INVENTION

Brakes incorporating discs may be found in a variety of vehicular and industrial applications. In industrial applications liquid-cooled disc brakes may be used. The brake can include a wear plate that is configured to engage a rotating disc during a braking process. The wear plate becomes heated due to friction involved in the retarding engagement. A flow of coolant (e.g., water) is utilized to cool the wear plate. Liquid-cooled brakes can benefit from improvements.

SUMMARY OF THE DISCLOSURE

The present disclosure provides a new and improved fluid-cooled brake assembly having an improved flow of coolant to promote the transfer of heat from components of the assembly. In an exemplary embodiment, improved heat transfer from the components to the coolant is promoted by creating a turbulent flow of the coolant in the coolant flow cavity. The cooling effect is also improved by constructing the coolant flow cavity with at least two coolant inlet ports and two coolant outlet ports.

In an exemplary embodiment there are two coolant inlet ports which are disposed 180° apart. The coolant outlet ports are disposed 90° from each inlet. The coolant inlets lead to radially aligned coolant entry channels, which are in flow communication with each other. The coolant entry channels allow coolant received therein to flow in either annular direction toward an outlet. Each coolant outlet channel can receive coolant from both inlets. Because of the multiport arrangement there is less of a pressure drop (i.e., less resistance) to the coolant flow between the inlets and the outlets. Thus, the shared inlet arrangement enables a higher flow rate of coolant through the cavity.

Another exemplary embodiment is directed to having steps in each coolant entry channel. The steps form coolant areas of different axial depths. The deepest area is adjacent the outermost portion of the channel. The stepped channel is arranged to cause more coolant to be diverted to the outermost section of the coolant flow cavity. Thus, enhanced cooling can be provided to cool the outermost (and hottest) section of an overlying braking plate, such as a wear plate.

A further exemplary embodiment is directed to having staggered rows of pin projections in the coolant flow cavity. The pin projections can contact the overlying brake plate. Heat can be transferred from the brake plate to the pin projections and the coolant. The rows of pin projections can include both full and partial pin projections. The partial pin projections can be part of annularly extending walls that separate chambers in the coolant flow cavity.

The ability to have greater coolant flow, combined with more effective cooling flow within the coolant flow cavity, provides greater cooling to heated braking components, such as a wear plate. Consequently, the temperature at the contact surface of a braking component can be lowered. The lower temperature enables the entire brake to run longer and more effectively. Thus, the arrangement provides for an improved liquid-cooled brake that can reliably provide braking, stopping, and drag force as needed for the desired braking application.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
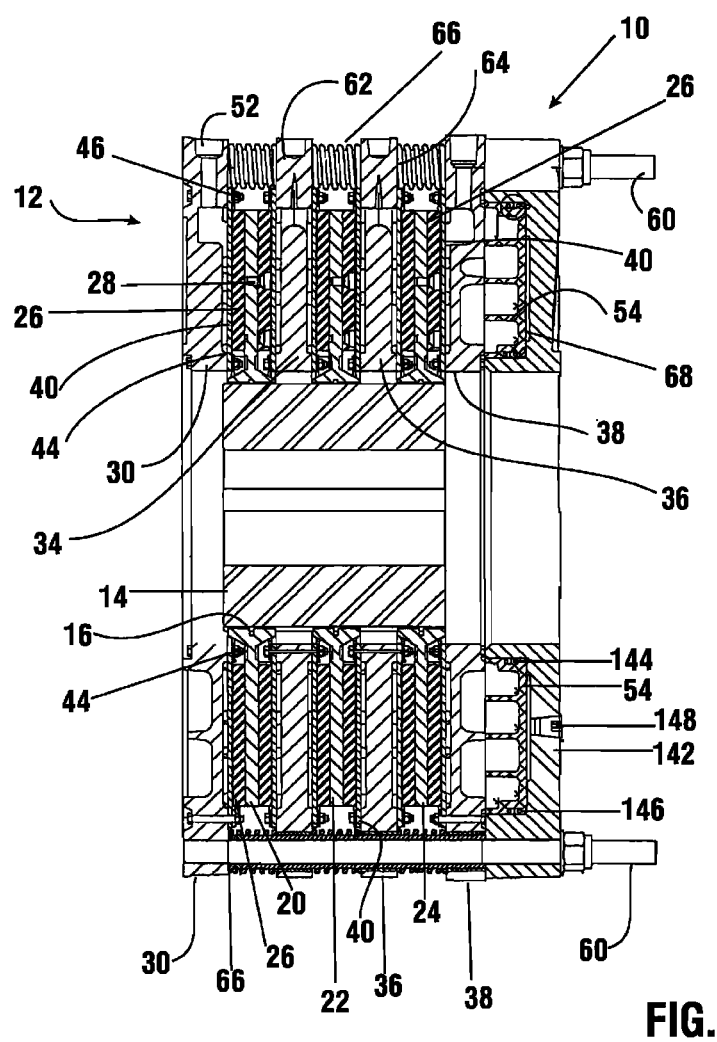
FIG. 1 is a cross section view of an exemplary embodiment of a brake assembly that includes an exemplary coolant flow cavity.

FIG. 1 illustrates a cross-section view of an exemplary embodiment of a braking system 10. The braking system 10 is a disc type, internally cooled unit configured to absorb and dissipate thermal loads associated with the brake applications. The braking system 10 may be used in industrial applications, such as, Draw works application, mooring application (such as in the oil and gas industry), dynamic braking, emergency stopping, and parking/holding. However, it should be understood that the braking system 10 may be used in any application where braking is required.

The braking system 10 can include a coupling assembly utilized as a brake. Such a coupling assembly is discussed in U.S. patent application Ser. No. 12/429,219 filed Apr. 24, 2009, which is herein incorporated by reference in its entirety. A water-cooled brake is discussed in U.S. Pat. No. 4,262,789 and in U.S. patent application Ser. No. 13/549,944 filed Jul. 16, 2012, the disclosures of each of which are incorporated herein by reference in their entirety. Cooling of a brake assembly is also discussed in U.S. Pat. No. 5,577,581 which is also incorporated herein by reference in its entirety.

The braking system 10 includes a brake assembly 12. The brake assembly is operable to stop, slow down, or to provide a continuous drag force on a rotating shaft. As previously mentioned, the brake assembly can be used in industrial applications, including the control of wind turbine blades. An example of such braking control can be found in U.S. Application 61/834,646 filed Jun. 6, 2013, which is herein incorporated by reference in its entirety.

The shaft to which the braking force is to be applied is attached to a splined hub 14. The splined hub may also be called a gear. The hub 14 accepts the shaft in its interior bore, which may have a key or a spline.

The hub 14 also has a splined exterior surface 16 which engages three friction discs 20, 22, 24. These friction discs rotate with the hub 14. Central splined openings in the friction discs mate with the splines on the hub allowing the friction discs to move in axial direction on the splines of the hub.

Each of the friction discs 20, 22, 24 has friction material 26 (e.g., brake pads) attached thereto on both axial sides. These brake pads 26 can be attached to the friction discs by fasteners 28. The brake pads 26 can be annular or arcuate in shape.

The brake assembly 12 includes a mounting flange 30, two reaction plates 34, 36, and a pressure plate 38. An annular wear plate 40 is fastened to the inner side of the mounting flange 30. A respective wear plate 40 is fastened to each respective side of a reaction plate 34, 36. Another wear plate 40 is fastened to the inner side of the pressure plate 38. Each wear plate 40 can be held in position by rings of bolts at interior and exterior portions of the wear plate. For example, the wear plate 40 can be fastened to the mounting flange 30 by a first ring of bolts 44 attached near the interior of the mounting flange 30 and a second (outer) ring of bolts 46 attached near the exterior of the mounting flange 30.

The braking system 10 includes a piston 54 that is operated to cause the braking action. As discussed in more detail later, movement of the piston 54 causes braking engagement to occur between the wear plates 40 and the brake pads 26. Each wear plate 40 is configured to frictionally engage a brake pad 26 during the braking process.

The mounting flange 30 is attached to a fixed body 32. For example, the mounting flange 30 can be anchored to a structure to which the brake is mounted. The mounting flange does not rotate. This fixed body prevents rotational movement of the brake assembly 12 when braking is applied. Likewise, each of the reaction plates 34 and the pressure plate 38 do not rotate. The piston 54, which can be an annular piston axially movably mounted in an annular cylinder, also does not rotate. Each of the pressure plate 38 and the reaction plates 34, 36 include openings 62, 64 which extend on their periphery. The pressure plate 38 and the reaction plates 34, 36 can move in the axial direction guided by studs 60. As can be seen, compression springs 66 extend between the mounting flange 30, reaction plates 34, 36, and the pressure plate 38. The compression springs 66 extend in surrounding relation of the studs 60. When the braking action is not applied, the compression springs 66 are operable to separate the mounting flange 30, the reaction plates 34, and the pressure plate 38. That is, the compression springs 66 are configured to release (act against) the braking force.

Other brake components are also shown in FIG. 1, including a cylinder 142, seals 144, 146, and a plug 148.

In an example of operation, the rotating shaft rotates the hub 14, which in turn rotates each of the friction discs 20, 22, 24. When the brake is to be applied, hydraulic or pneumatic pressure is applied to one or more pressure ports 68 of the cylindrical body of the piston 54. The pressure applied to a cavity in the cylinder causes the piston 54 to move axially. As shown in FIG. 1, the movement of the piston 54 will impart axial movement to the pressure plate 38. Continued axial movement of the pressure plate 38 causes the friction discs 20, 22, 24 (and their brake pads 26) to be squeezed in sandwiched relation between the reaction plates 34 and the mounting flange 30. Thus, force applied by movement of the piston 54 causes the wear plates 40 to slow and/or stop the rotation of the hub 14 and the shaft that is engaged therewith. Because the friction discs 20, 22, 24 can move axially on the splines of the hub 14, and the reaction plates 34 and pressure plate 38 can move in guided relation on the studs 60, the full force applied by the piston 54 is effective to slow rotation of the hub 14. When the braking pressure is released from the piston cylinder 54, the force imparted by the compression springs causes the piston 54 to be retracted so that the friction discs 20, 22, 24 can again freely rotate.

An exemplary braking operation will now be described in more detail. Application of fluid pressure through the fluid pressure port 68 causes the annular piston 54 to move inwardly in an axial direction. As the piston moves to the left as shown in FIG. 1, it applies a force against the pressure plate 38. This force overcomes the force of the springs 66 and causes the wear plate 40 attached to the pressure plate 38 to be moved to engage the upstream friction brake pad 26 attached to the rotatable disc 24. The force also causes the rotating disc 24 to axially move on the outer splined surface 16 of the hub 14. Axial movement of the disc 24 causes both of its brake pads 26, 26 to be in clamped sandwiched engagement between the wear plate 40 on pressure plate 38 and the wear plate 40 on reaction plate 36. The clamping force applied by the brake fluid pressure causes a rotational drag force corresponding to the applied fluid pressure on the rotating disc 24. As can be appreciated, this drag force operates to resist rotational movement of the rotating disc 24, and thus provides braking action to the rotating disc 24. The braking action can be effectively varied rapidly by changing the brake fluid pressure applied at the fluid pressure port.

Continuing with the exemplary braking operation, the applied brake fluid pressure additionally causes the second wear plate 40 on the reaction plate 36 to engage the first brake pad 26 of rotatable disc 22. This action in turn causes the second (downstream) brake pad 26 of the rotatable disc 22 to engage the first wear plate 40 on the reaction plate 34. This action in turn causes the second wear plate 40 on the reaction plate 34 to engage the first brake pad 26 of rotatable disc 20. This action in turn causes the second brake pad 26 of the rotatable disc 20 to engage the wear plate 40 on the mounting flange 30. The mounting flange is fixedly secured to prevent rotation thereof. As can be appreciated, braking action is provided to each of the rotating discs 20, 22, 24. When the braking pressure is removed, the return force provided by the compression springs causes the piston 54 to be retracted. With no braking action being applied, the friction discs 20, 22, 24 are again free to rotate.

Of course it should be understood that the multi friction disc arrangement described with regard to FIG. 1 is exemplary, and in other arrangements other configurations may be used. For example, in other exemplary brake assembly embodiments less or more friction discs can be used along with less or more reaction plates. For example, two friction discs may be used with one reaction plate. Likewise, four friction discs may be used with three reaction plates, etc.

In an exemplary embodiment, the reaction plates (or brake discs) 34, 36 are each constructed of an alloy of aluminum and silicon carbide. Such an alloy may be referred to as an aluminum metal matrix composite, or aluminum MMC. One known aluminum MMC is commercially available under the brand name DURALCAN™. In one embodiment, the entire brake disc is constructed of aluminum MMC. In an alternative embodiment, the front face surface of the brake disc is constructed of aluminum MMC. In other alternative embodiments, other metals may be employed.

Of course, the frictional force of the brake pads 26 against the wear plates 40 generates heat. Each wear plate 40 can comprise a metal outer surface, such as a copper surface. Each annular wear plate 40 can be positioned adjacent to (e.g., overlying) and bounding a side of a coolant flow cavity (e.g., a water jacket). In an exemplary cooling arrangement, the brake assembly 12 achieves enhanced wear plate cooling by use of a novel heat transfer configuration for this coolant flow cavity.

Figure 2:
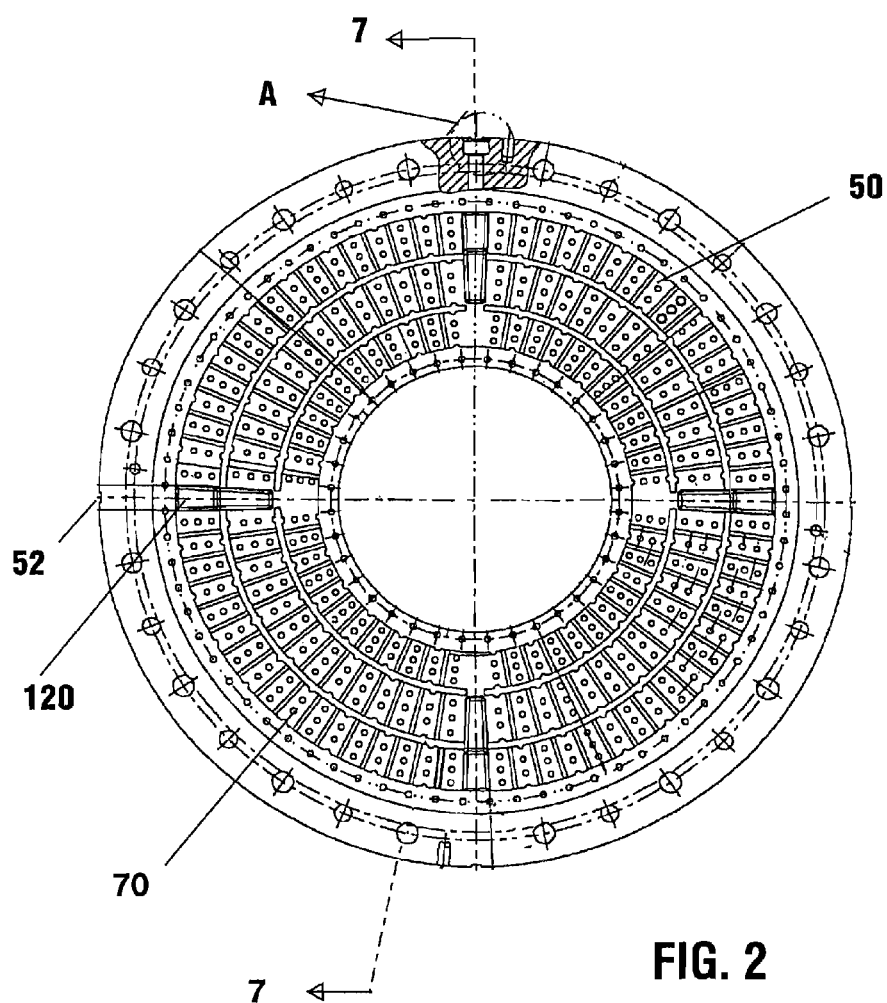
FIG. 2 is a perspective view of an exemplary embodiment of the coolant flow cavity.

FIG. 2 shows a portion of the brake assembly 12. The perspective view includes an exemplary embodiment of an annular coolant flow cavity 50. The cavity is structurally configured to cool (during braking operation) an adjacent overlying wear plate (or disc). For purposes of clarity, the cavity is shown with the wear plate removed. The coolant flow cavity 50 is configured to hold a heat transfer coolant (e.g., a liquid-based coolant such as water). Each coolant flow cavity 50 has coolant ports 52 through which fluid coolant can enter or exit.

Figure 3:
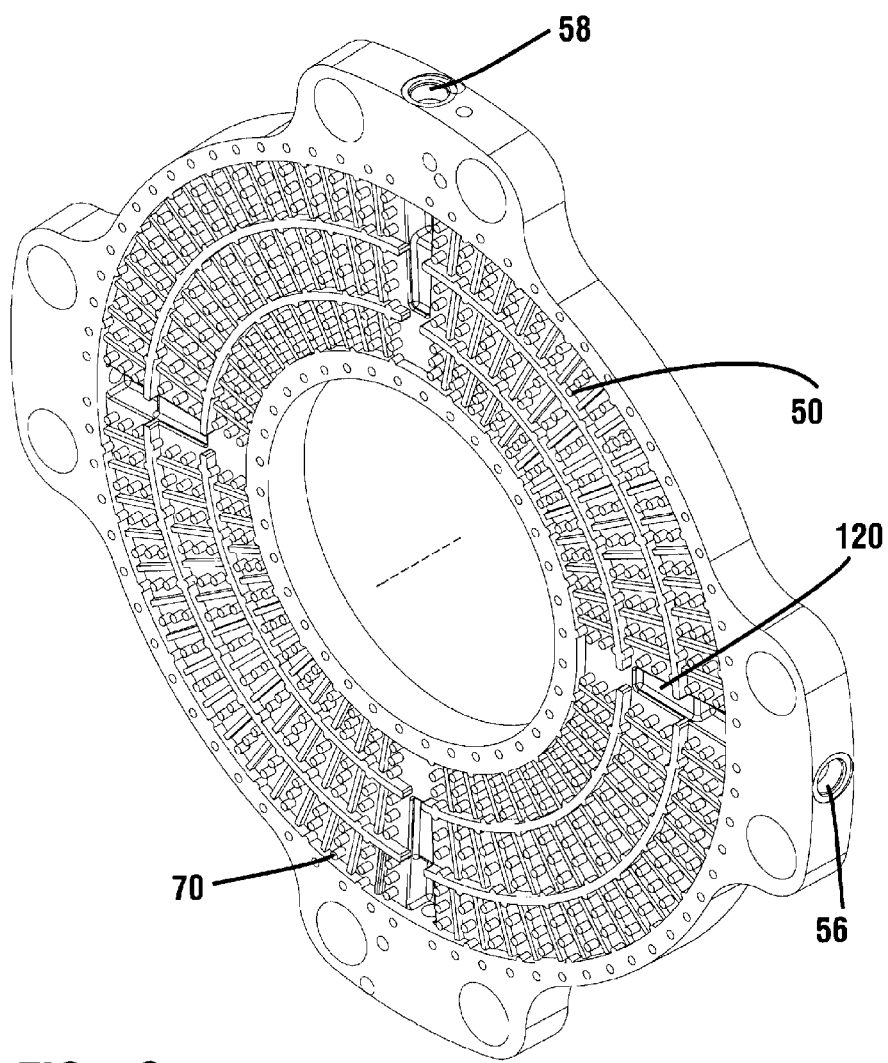
FIG. 3 is an angled view of a coolant flow cavity that is similar to the cavity shown in FIG. 2.

FIG. 3 shows a rotated view of the coolant flow cavity 50. Coolant ports 52, such as an inlet port 56 and an outlet port 58, are also shown. The center axis is represented by a broken line.

In an exemplary embodiment there are four coolant ports 52 associated with the coolant flow cavity 50. Two fluid inlet ports 56 (or openings) to the cavity 50 are approximately 180° apart. Two fluid outlet ports 58 are also approximately 180° apart. Each fluid outlet opening 58 is located approximately halfway between the fluid inlet openings 56. Thus, each outlet opening 58 is approximately 90° away from an inlet opening 56, and vice versa. Coolant enters the cavity 50 through an inlet opening 56, then flows through the cavity 50, and then exits the cavity 50 through an outlet opening 58.

Figure 4:
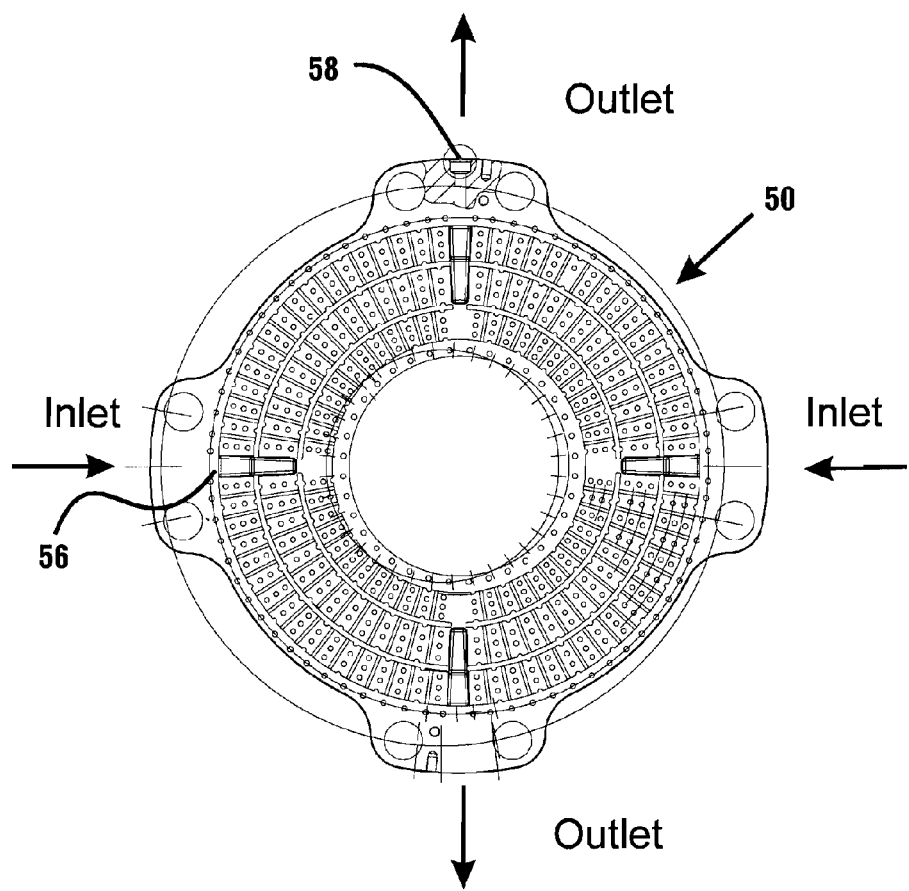
FIG. 4 is a perspective view of an exemplary embodiment of the arrangement of dual inlet and outlet ports associated with an exemplary coolant flow cavity.

FIG. 4 shows a particular exemplary embodiment in which water enters the water cavity 50 through inlet ports located at the 3 o'clock and 9 o'clock positions. The heated water then exits the water cavity 50 through outlet ports located at the 12 o'clock and 6 o'clock positions. Of course it should be understood that these positions may be optimum for some brake arrangements, but it is not required that these positions be used. Nor is it required that the brake be positioned with a shaft that extends horizontally. Rather, in some arrangements the fluid-cooled brake can also be used with a shaft that extends vertically (or angularly).

Coolant flowing through the respective coolant flow cavities 50 of the mounting flange 30, the reaction plates 34, and the pressure plate 38 receives heat during the heat transfer process of cooling the brake system. This heated coolant exits from a coolant outlet port 58 and then releases its absorbed heat to atmosphere through a radiator or to a heat sink. The coolant, when at a lower temperature, can then be returned to a cavity inlet port 56 for reuse.

Figure 5:
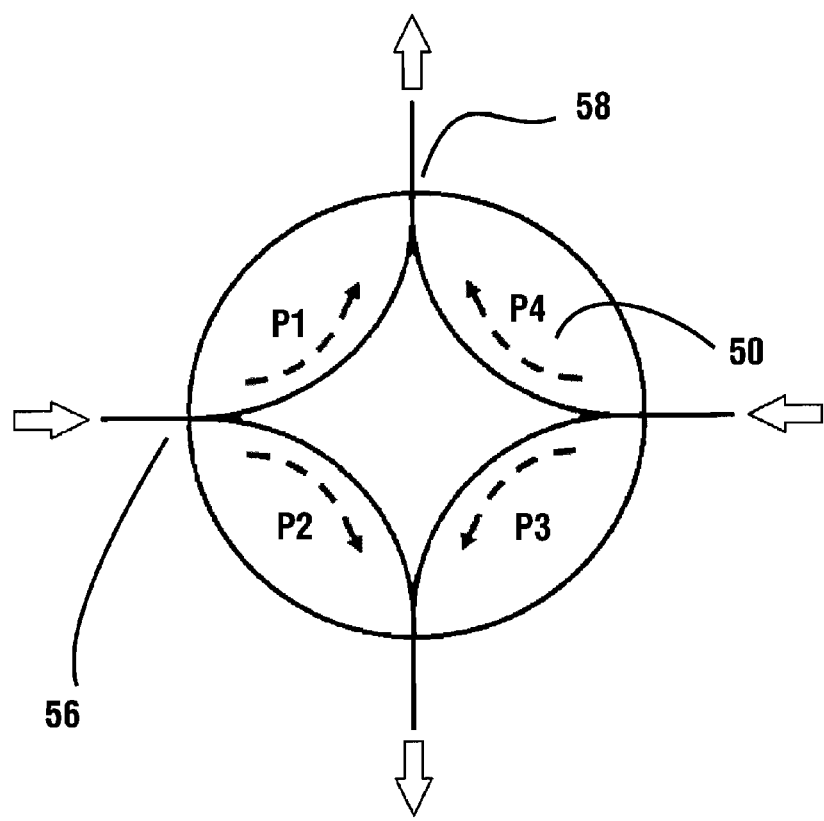
FIG. 5 is view of coolant flow directions in an exemplary coolant flow cavity.

FIG. 5 further shows coolant flow directions (broken arrows) P1, P2, P3, P4 inside the exemplary coolant flow cavity 50. In the exemplary embodiment shown, inlet coolant enters the water cavity at the 3 o'clock and 9 o'clock positions. From each inlet position the coolant can flow in opposite directions to the outlets located at the 12 o'clock and 6 o'clock positions. The area adjacent an outlet is in open flow communication with each inlet. Thus, before exiting the cavity through a respective outlet, the collected coolant adjacent the outlet can be a mixture of both coolant received from the first inlet and coolant received from the second inlet. The difference in pressures between the inlets and the outlets can be used to drive the coolant through the cavity.

Figure 6:
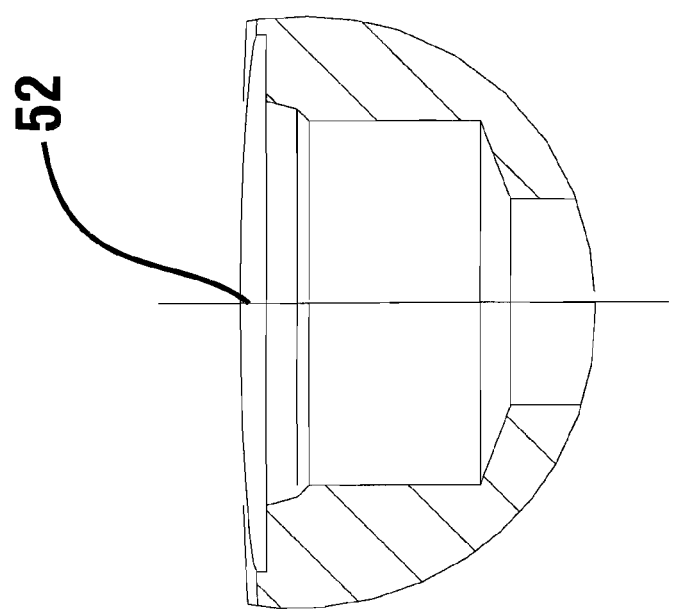
FIG. 6 is an enlarged sectional view of the area indicated "A" in FIG. 2.

FIG. 6 shows an enlarged sectional view of the area indicated "A" in FIG. 2. The area includes a coolant port 52.

Figure 7:
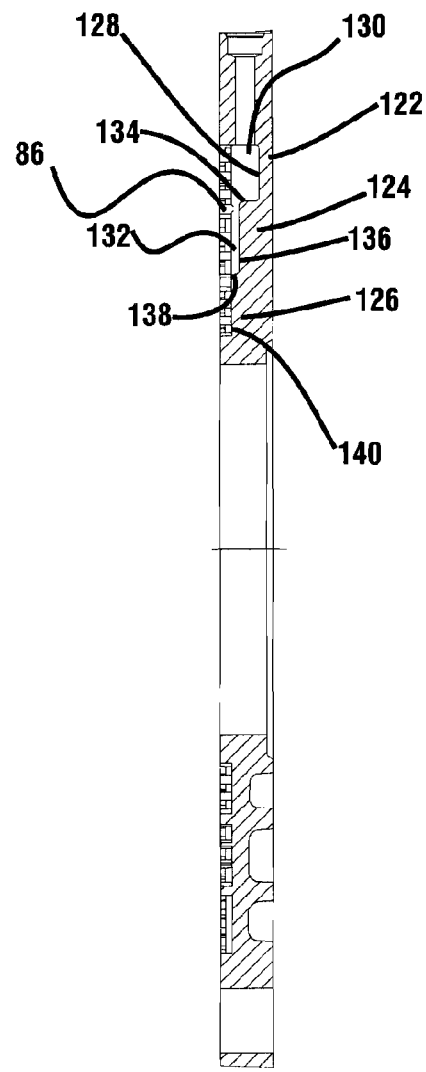
FIG. 7 is an enlarged sectional view taken along line 7-7 in FIG. 2.
Figure 8:
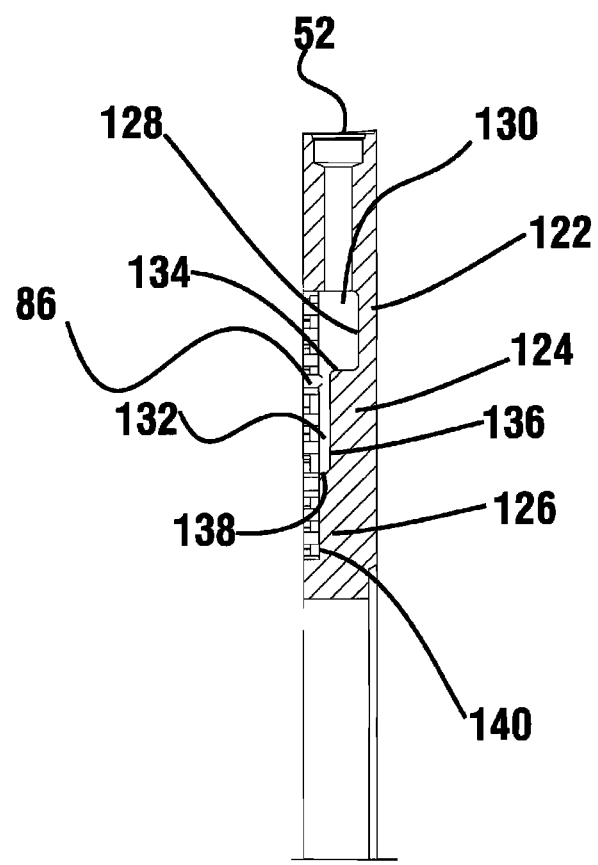
FIG. 8 is an enlarged view of a portion of the structure shown in FIG. 7.

FIG. 7 shows a sectional view taken along the line 7-7 in FIG. 2. As discussed in more detail later, the coolant flow cavity 50 includes a stepped flow channel adjacent each coolant port 52. To provide additional clarity, FIG. 8 shows an enlargement of the coolant channel step structure shown in FIG. 7.

Figure 9:
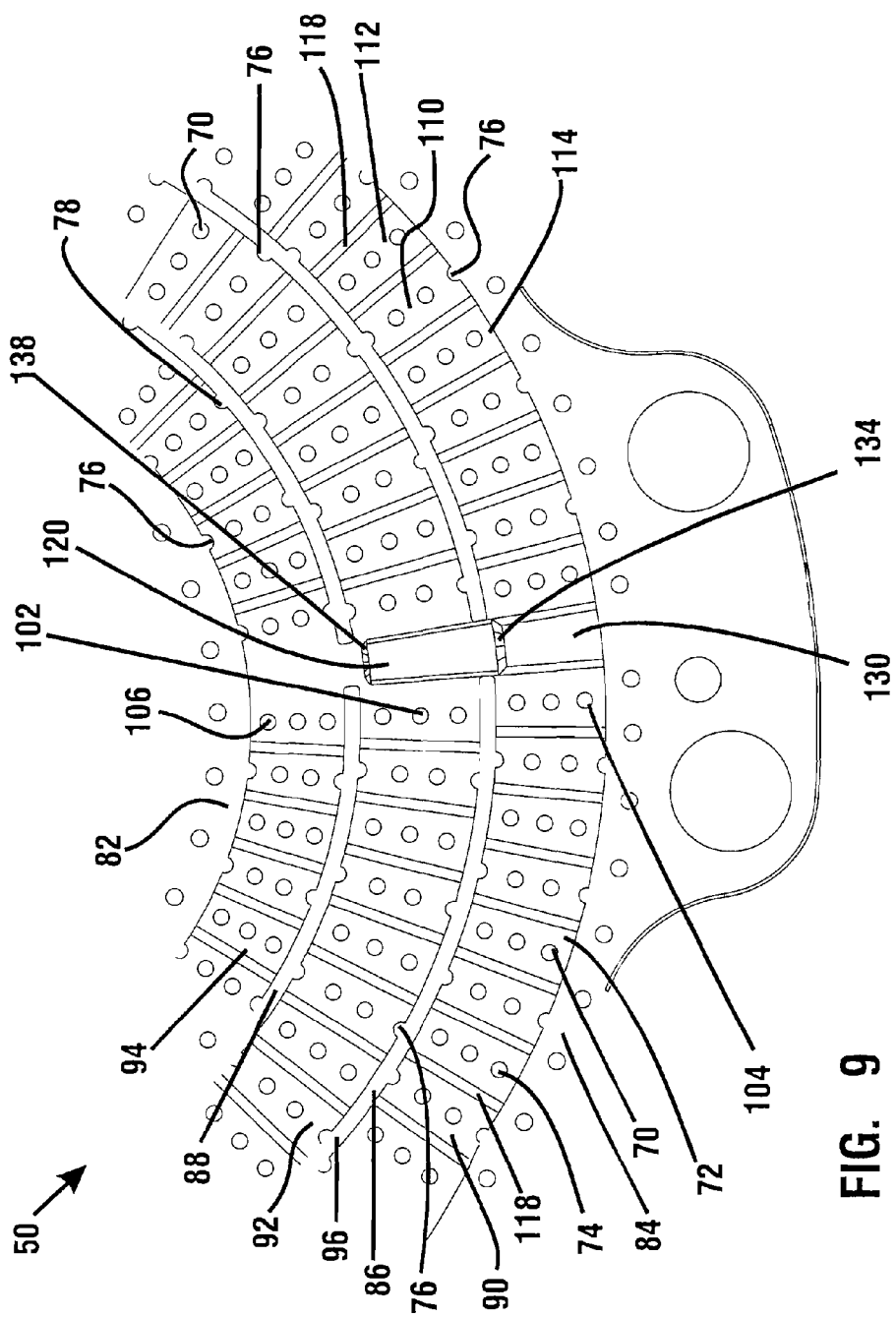
FIG. 9 is an enlarged angled view of a coolant channel area shown in FIG. 2.

FIG. 9 is an enlarged view of a section of the coolant cavity 50. As can be seen, there are numerous spaced pin projections 70 in the flow area of the coolant flow cavity 50. These pin projections 70 extend from the surface 72 of a base casting that bounds the cavity 50, outward to a substantially flat top 74 of the pin projections. In an exemplary embodiment all of the flat tops 74 are in the same plane. Thus, these flat tops 74 can all engage the inside surface of an overlying wear plate 40. Because the pins 70 all have substantially flat tops 74 and are all substantially at the same axial height, they can each contribute to supporting the inside surface of an adjacent wear plate 40.

Furthermore, because the pins 70 supportingly engage the wear plate 40, they also act as metal heat conductors that draw heat away from the wear plate. This act functions to cool the wear plate 40. This heat is then transferred to the liquid coolant material that flows in the coolant cavity 50. As liquid coolant flows from a cavity inlet 56 to a cavity outlet 58, it absorbs heat from the pins 70 (which are in contact with the wear plate 40). The flowing coolant is also in direct contact with the inside surface of the wear plate 40 to provide direct cooling thereto.

The coolant flow cavity 50 also includes a plurality of concentric rings positioned between the inside wall 82 and the outside wall 84 that radially bound the cavity 50. The use of two concentric rings 86, 88 define three separate flow chambers 90, 92, 94. The top of each concentric ring 86, 88 also has a substantially flat top 96. The flat tops 96 are also substantially the same height as the flat tops 74 of the projections 70. Thus, the upper surfaces 96 of the rings 86, 88 can also be used to both support the inner surface of a wear plate 40 and remove heat therefrom. Coolant within the cavity 50 functions to remove heat from the rings 86, 88.

The coolant flow cavity 50 can also include some partial (non whole) pin configurations. For example, a partial pin configuration may comprise a half pin configuration. A half pin 76 may comprise approximately half the volume of a complete projecting pin 70. Similarly, a half pin 76 can also have a substantially flat top 78 which contacts with an inner surface of a wear plate 40, but with an upper outer flat surface area that is approximately only half of the normal upper outer flat surface area of a complete flat top 74. As can be seen, half pins 76 can extend from the outer and inner surfaces of the concentric rings 86, 88. Similarly, half pins 76 can extend from the outer and inner walls 82, 84 of the cavity 50.

As can be seen the radially extending row of (three) pin projections 70 in the intermediate chamber 92 is offset relative to the radially extending row of (three) pin projections in each radially adjacent flow chamber 90, 94. For example, the set of three pins in the pin row 102 in chamber 92 is offset from the set of three pins in the pin row 104 in chamber 90. Likewise, the set of three pins in the pin row 102 is also offset from the set of three pins in the pin row 106 in chamber 94.

Furthermore, the angularly spaced individual rows of pin projections 70 in each respective flow chamber 90, 92, 94 are also radially offset from each other. For example, the pins 70 in radial pin row 110 in chamber 90 are offset (or staggered) from the pins 70 in the immediately adjacent radial pin rows 112, 114 in the same chamber 90.

A particular exemplary embodiment includes three flow chambers 90, 92, 94. Moving in the arcuate direction in each respective flow chamber 90, 92, 94 there are alternating sets of three pins 70 and then two pins 70 with two half pins 76 on each row end. Thus, each pin row can comprise a total volume of three pins.

The exemplary staggered row arrangements of three full pins 70, then two full pins plus two half pins 76, forces coolant flow through the arcuate flow chambers to take a circuitous path around the pins 70, 76. Forcing the coolant to travel this circuitous (non straight) path causes the coolant to flow more quickly over the surface area of the pins and half pins, and causes flow at a higher velocity, which helps to carry away more heat. As can be appreciated, the offsetting of pins 70, 76 in both the radial direction and the angular direction causes greater turbulence in the coolant cavity 50 which leads to greater heat transfer and cooling.

In addition, in each respective flow chamber 90, 92, 94 between each arcuately spaced pin row there is a radial outward extending projection (e.g., a wall) or weir 118. The weir 118 is lower than the top surface of the pins 70, 76. Thus, there is a flow space or gap between the upper surface of a weir and the adjacent inner surface of an installed wear plate 40. This weir arrangement forces coolant to flow toward the inside surface of the nearby wear plate 40. Each weir 118 causes higher velocity flow adjacent to the inside surface of the wear plate. Thus, the weirs help to further increase heat transfer and cooling.

The combination of the circuitous route that the coolant is required to take to pass between the staggered pins 70, 76, and also the requirement that the coolant pass over each weir 118 to create a higher flow condition in the area adjacent to the inside surface of the wear plate 40, creates turbulent flow conditions that facilitate carrying away heat from the wear plate and the pins.

The exemplary coolant cavity 50 includes an inlet manifold configuration that further helps to disperse the incoming coolant. As can be seen in FIG. 9, an inlet port at the exterior of the cavity body 50 allows entry coolant to flow radially inward into the channel 120. The inlet coolant can then flow in either arcuate direction.

The radially outermost portion of a brake pad 26 will be traveling at a higher velocity relative to its radially inward portion. Thus, the radially outermost portion of the wear plate 40 will correspondingly receive the highest velocity of friction engagement with the brake pad 26. The flow chamber 90 positionally generally corresponds to this outermost braking area of the wear plate 40 which receives the greatest heat generation. Thus, the exemplary arrangement of the inlet manifold configuration causes most of the coolant liquid to be directed toward this outer flow chamber 90.

The inlet manifold configuration includes a radially extending stepped channel 120. As shown in FIGS. 8-9, the channel 120 includes (extending radially inward) an entry first step 122, a second step 124, and a third step 126. The first step 122 includes a radially extending generally flat surface 128. As shown in FIG. 8, the first step 122 helps to form a first cavity 130 there above. The second step 124 helps to form a second cavity 132 there above. The first cavity 130 is axially deeper than the second cavity 132. In a similar manner, the second cavity 132 extends axially deeper than a third cavity formed by the third step 126.

The stepped arrangement causes coolant received from an inlet port 56 to flow radially inward through the relatively deeper (or recessed) channel area 130 and then hit the leading (outer) edge 134 of the second step 124. As can be seen in FIG. 9, this outer edge 134 is positioned radially outward of the first concentric ring 86. Thus, the second step 124 is strategically positioned to force inlet fluid to move axially outward into the first (outer) flow chamber 90, between the outer bounding wall 84 (of the cavity 50) and the outside surface of the first concentric ring 86. The second step 124 forces entering coolant to flow in both circumferential directions in the flow chamber 90. The second step 124 can also cause most (the greatest volume) of the entering coolant to be diverted to the outer flow chamber 90. The amount of coolant diverted is within a predetermined percentage range of the total entering coolant flowing into the channel 120. As previously discussed, the flow chamber 90 is the nearest flow chamber to the wear plate area which receives the greatest amount of heat during the braking process. Thus, the exemplary arrangement causes a greater amount of coolant to be allocated to the hottest portion of the brake wear plate.

The second step 124 includes a generally flat surface 136 that extends radially inward to meet the (outer) edge 138 of the third step 126. As seen in FIG. 9, this outer edge 138 extends radially outward of the second concentric ring 88. Thus, the edge 138 causes fluid in the channel 120 to be pushed into the area of the second (middle or center) flow chamber 92, which is radially bounded by the concentric rings 86, 88. This arrangement causes a predetermined percentage of coolant to be diverted in both circumferential directions into the second flow chamber 92. Again, the coolant amount diverted into the second flow chamber can be a controlled predetermined amount. For example, the diverted amount can be set to be a predetermined percentage of the total amount of coolant flowing into the channel (or a percentage of the remaining coolant amount that was not allocated to the flow chamber 90).

The remaining entering fluid, which was pushed radially inward beyond the second step 124, travels onto the generally flat surface 140 of the third step 126. From here the coolant can spread out in both circumferential directions in the inner flow chamber 94, between the inner bounding wall 82 (of the cavity 50) and the inside surface of the second concentric ring 88. As previously discussed, the cooling needed in the innermost area 94 is generally less than that needed in the center area 92, and the cooling needed in the center area 92 is generally less than that needed in the outer area 90. Again, the percentage of coolant remaining to be diverted into the inner flow chamber 94 can be a controlled (or predetermined) percentage of the total amount.

As can be appreciated, the exemplary manifold structure provides for directing the desired percentages of incoming coolant into the different flow chambers 90, 92, 94 of the coolant jacket 50. That is, the exemplary arrangement allows to be provided to each respective area 90, 92, 94, the predetermined amount of coolant allocated for that respective area.

As can be appreciated, the dimensions of the steps can be established based on several factors (such as volume and flow rate of the inlet coolant, etc.) to achieve the desired percentage of coolant allocation. For example, the steps can be configured to cause the coolant amount diverted to flow chamber 90 to be within the predetermined range of 33-60%, the coolant amount diverted to flow chamber 92 to be within the predetermined range of 15-30%, and the coolant amount diverted to flow chamber 94 to be within the predetermined range of 10-25%.

The same manifold configuration is also usable to provide collection of coolant at the outlet ports 58. Employing the same manifold configuration at all four coolant ports 52 further allows for easy usage reversal of inlet and outlet ports.

As can be appreciated, the exemplary water cooling configuration allows for liquid-cooled brakes that can operate for extended periods of the time while resisting high horse power and torque loads. In some arrangements, the cooling also facilitates being able to operate the brake in a continuous drag mode, which continuous drag may be required in various types of applications to control the speed and/or torque of a rotating shaft.

Also, for the reaction plates 34, 36 on which the coolant (water) jacket 50 extends on both sides, one coolant port 52 can connect to two stepped manifolds, one on each axial side of the respective reaction plate. That is, both opposite coolant jackets 50 near a reaction plate can share a common inlet port 56.

As can be appreciated, the novel arrangement improves the brake cooling. The novel structural configuration of the interior of the water jacket, further combined with having two inlets and two outlets, enables a higher flow rate of coolant through the coolant jacket. This can be achieved because there is less of a pressure drop (i.e., less resistance) to the coolant flow between the inlets and the outlets. The ability to have greater coolant flow combined with more effective cooling flow within the coolant jacket provides greater cooling to the brake assembly. Consequently, the result lowers the temperature at the brake wear surfaces. The lower temperature enables the brake to run longer, more effectively, and more reliably to provide braking, stopping, and drag force as is needed for the particular braking application.

Although the illustrated embodiment depicts a brake coolant jacket 50 having three concentric coolant chambers 90, 92, 94, it should be understood that alternative embodiments may include more or fewer chambers. For example, four, five, six or more coolant chambers may be used in some embodiments. In other alternative embodiments, two or less coolant chambers may be used.

In an exemplary embodiment, the coolant jacket 50 is a unitary structure. In other words, the entry channel 120, the pin projections 70, 76, the weirs 118, the walls 82, 84, and the concentric rings 86, 88 can be part of a single, unitary component. The coolant jacket 50 may be cast, machined, printed, or otherwise formed as a single piece. In an alternative embodiment, the coolant jacket 50 may be assembled from a plurality of separate components. In some exemplary embodiments, water may be used as the coolant.

Of course it should be understood that the structures and operations described are exemplary, and in other embodiments other structures and operations may be used.

Thus, the embodiments of the liquid cooled brake achieve desirable properties, eliminate difficulties encountered in the use of prior devices and systems, solve problems and attain the desirable results described herein.

In the foregoing description, certain terms have been used for brevity, clarity and understanding. However, no unnecessary limitations are to be implied therefrom, because such terms are used for descriptive purposes and are intended to be broadly construed. Moreover, the descriptions and illustrations herein are by way of examples, and the invention is not limited to the details shown and described.

In the following claims, any feature described as a means for performing a function shall be construed as encompassing any means known to be capable of performing the recited function, and shall not be deemed limited to the particular structure shown in the foregoing description or mere equivalents thereof.

Further, it should be understood that language which refers to a list of items such as "at least one of a, b or c" (Example 1) means "at least one of a, b and/or c." Likewise, it should be understood that language which refers to a list of items such as "at least one of a, b and c" (Example 2) means "at least one of a, b and/or c." The list of items in Example 2 is not required to include one of each item. The lists of items in both Examples 1 and 2 can mean "only one item from the list of any combination of items in the list." That is, the lists of items (in both Examples 1 and 2) can mean only a, or only b, or only c, or any combination of a, b and c (e.g. ab, ac, bc, or abc).

Having described the features, discoveries, and principles of the exemplary arrangements, the manner in which they are constructed and operated, and the advantages and useful results attained; the new and useful structures, devices, elements, arrangements, parts, combinations, systems, equipment, operations, methods, processes, and relationships are set forth in the appended claims.

We claim:
1. Apparatus comprising:
a liquid-cooled brake component,
  wherein the brake component includes an annular base,
  wherein the brake component includes an annular wear plate,
    wherein the wear plate is in connection with the base,
    wherein the wear plate is coaxial with the base,
    wherein the wear plate includes an outer surface and an inner surface,
      wherein the outer surface is configured for retarding engagement with a rotating disc,
  wherein the brake component includes a coolant cavity formed between the inner surface and the base,
    wherein the coolant cavity includes four radially extending channels spaced apart approximately 90° in an annular direction,
      wherein each channel is bordered by a stepped portion of the base,
        wherein the stepped portion includes at least one step formed in the base,
        wherein the at least one step includes a first step,
        wherein the first step includes a radially extending surface portion and an axially extending surface portion,
      wherein each channel includes a radially extending outermost coolant area of a first axial depth,
        wherein the outermost coolant area is radially inwardly bounded at least in part by the axially extending surface portion of the first step,
      wherein each channel includes a radially extending inward coolant area of a second axial depth,
        wherein the inward coolant area is radially inward of the outermost coolant area,
        wherein the inward coolant area is radially adjacent to the outermost coolant area,
        wherein the inward coolant area is axially bounded by the radially extending surface portion of the first step,
        wherein the second axial depth is less than the first axial depth,
    wherein the coolant cavity respectively includes four arcuate sections,
      wherein each respective arcuate section is respectively located between two adjacent channels,
      wherein each arcuate section includes plural flow chambers,
        wherein the flow chambers place adjacent channels in coolant flow communication,
        wherein coolant flowing into a channel is allowed to enter both adjacent arcuate sections,
      wherein each arcuate section includes at least one annularly extending separating wall,
        wherein the at least one annularly extending separating wall includes a first separating wall, wherein the first separating wall separates an outermost flow chamber from a radially adjacent inward flow chamber,
wherein the inward flow chamber is radially inward of the outermost flow chamber,
wherein the outermost flow chamber includes an axial depth that is less than the second axial depth,
wherein the radially adjacent inward flow chamber includes an axial depth that is less than the second axial depth,
wherein the first separating wall is located radially inward of the axially extending surface portion of the first step.

2. The apparatus according to claim 1
wherein the coolant cavity includes four coolant ports,
  wherein the four coolant ports comprise a pair of the coolant inlet ports spaced apart approximately 180° and a pair of the coolant outlet ports spaced apart approximately 180°,
wherein the four channels comprise a pair of the coolant inlet channels spaced apart approximately 180° and a pair of the coolant outlet channels spaced apart approximately 180°,
  wherein each respective coolant inlet channel is substantially radially aligned with a respective coolant inlet port,
    wherein coolant received into a respective coolant inlet channel from a respective coolant inlet port is free to flow in both:
      a first arcuate direction to a first coolant outlet port, and
      a second arcuate direction to a second coolant outlet port,
        wherein the second arcuate direction is opposite the first arcuate direction,
wherein each respective coolant outlet channel is in fluid communication with both coolant inlet channels,
  wherein each respective coolant outlet channel allows for mixing of coolant received from both coolant inlet channels.

3. The apparatus according to claim 2
wherein the at least one step includes a second step,
  wherein the second step includes a radially extending surface portion and an axially extending surface portion,
wherein the first channel includes a radially extending innermost coolant area that includes a maximum axial depth comprising a third axial depth,
  wherein the innermost coolant area is radially inward of the inward coolant area,
  wherein the innermost coolant area is radially adjacent to the inward coolant area,
    wherein the innermost coolant area is axially bounded at least in part by the radially extending surface portion of the second step,
      wherein the third axial depth is less than the second axial depth.

4. The apparatus according to claim 3
wherein the at least one annularly extending separating wall includes a second separating wall,
  wherein the second separating wall separates the inward flow chamber from a radially adjacent innermost flow chamber,
  wherein the second separating wall is located radially inward of the axially extending surface portion of the second step.

5. The apparatus according to claim 1 wherein the outermost flow chamber is radially inwardly bounded by the first separating wall and radially outwardly bounded by an outer wall of the coolant cavity,
  wherein the outermost flow chamber includes arcuately spaced portions separated by weir walls,
    wherein each weir wall radially extends from the first separating wall to the outer wall,
    wherein each weir wall axially extends a first distance,
  wherein the outermost flow chamber includes plural sets of pin projections,
    wherein each respective set includes a same total amount of pin projections,
      wherein the pin projections in a set are substantially radially aligned,
      wherein each pin projection axially extends a second distance,
        wherein the second distance is greater than the first distance,
    wherein each respective spaced portion includes a respective set,
      wherein first alternating spaced portions include only complete pin projections,
      wherein second alternating spaced portions include both complete pin projections and partial pin projections,
        wherein the complete pin projections in the second alternating spaced portions are displaced radially relative to the pin projections in the first alternating spaced portions,
        wherein each second alternating spaced portion includes partial pin projections formed in the first separating wall and partial pin projections formed in the outer wall.

6. Apparatus comprising:
a liquid-cooled brake component,
  wherein the brake component includes an annular base,
  wherein the brake component includes a disc coaxially arranged with the base,
    wherein the disc is in operative connection with the base,
    wherein the disc includes an outer surface and an inner surface,
      wherein the outer surface is configured to operatively engage a rotatable disc member so as to retard rotational movement thereof,
  wherein the brake component includes a coolant cavity that extends between the inner surface and the base,
    wherein the coolant cavity includes coolant ports sequentially spaced apart approximately 90° in an annular direction,
      wherein each respective coolant port is in substantially radially aligned flow communication with a respectively corresponding radially extending channel,
        wherein each channel is in flow communication with each adjacent channel,
    wherein the coolant cavity allows a coolant flow arrangement in which a first pair of the coolant ports spaced apart approximately 180° are coolant inlet ports and a second pair of the coolant ports spaced apart approximately 180° are coolant outlet ports,
      wherein the second pair differs from the first pair, wherein coolant received into a respective channel from a corresponding inlet port of the first pair is free to flow in both:
a first arcuate direction to the channel corresponding with a first outlet port of the second pair, and
a second arcuate direction to the channel corresponding with a second outlet port of the second pair,
wherein the second arcuate direction is opposite the first arcuate direction,
wherein each respective channel corresponding with a respective outlet port of the second pair is free to receive coolant from both:
the channel corresponding with a first inlet port of the first pair, and
the channel corresponding with a second inlet port of the first pair,
wherein the coolant received in the respective channel from both the first inlet port and the second inlet port is free to mix in the respective channel.

7. The apparatus according to claim 6 wherein the coolant cavity includes a total of four coolant ports,
wherein the four coolant ports include a pair of the coolant inlet ports spaced apart approximately 180°,
wherein the four coolant ports include a pair of the coolant outlet ports spaced apart approximately 180°,
wherein each coolant outlet port is spaced approximately 90° from each coolant inlet port.

8. The apparatus according to claim 7
wherein a first coolant inlet port is relatively positioned at three o'clock,
wherein a first coolant outlet port is relatively positioned at six o'clock,
wherein a second coolant inlet port is relatively positioned at nine o'clock,
wherein a second coolant outlet port is relatively positioned at twelve o'clock.

9. The apparatus according to claim 6
wherein the coolant cavity includes a first channel corresponding to a first inlet port,
wherein the first channel is bordered by a stepped portion of the base,
wherein the stepped portion includes at least one step formed in the base,
wherein the at least one step includes a first step,
wherein the first step includes a radially extending surface portion and an axially extending surface portion,
wherein the first channel includes a radially extending outermost coolant area that includes a maximum axial depth comprising a first axial depth,
wherein the outermost coolant area is radially inwardly bounded at least in part by the axially extending surface portion of the first step,
wherein the first channel includes a radially extending inward coolant area that includes a maximum axial depth comprising a second axial depth,
wherein the inward coolant area is radially inward of the outermost coolant area,
wherein the inward coolant area is radially adjacent to the outermost coolant area,
wherein the inward coolant area is axially bounded at least in part by the radially extending surface portion of the first step,
wherein the second axial depth is less than the first axial depth,
wherein the coolant cavity includes adjacent arcuate sections separated by the first channel,
wherein each arcuate section includes an annularly extending separating wall that separates an outermost flow chamber from an adjacent inward flow chamber,
wherein the inward flow chamber is radially inward of the outermost flow chamber,
wherein the outermost flow chamber includes a maximum axial depth that is less than the second axial depth,
wherein the inward flow chamber includes a maximum axial depth that is less than the second axial depth,
wherein the separating wall is located radially inward of the axially extending surface portion of the first step,
wherein location of the axially extending surface portion of the first step causes an amount of inlet coolant flowing into the first channel to be diverted into the outermost flow chambers of the adjacent arcuate sections,
wherein the amount diverted is within a predetermined percentage range of the inlet coolant flowing into the first channel.

10. The apparatus according to claim 9
wherein the at least one step includes a second step,
wherein the second step includes a radially extending surface portion and an axially extending surface portion,
wherein the first channel includes a radially extending innermost coolant area that includes a maximum axial depth comprising a third axial depth,
wherein the innermost coolant area is radially inward of the inward coolant area,
wherein the innermost coolant area is radially adjacent to the inward coolant area,
wherein the innermost coolant area is axially bounded at least in part by the radially extending surface portion of the second step,
wherein the third axial depth is less than the second axial depth,
wherein each arcuate section includes an annularly extending second separating wall,
wherein the second separating wall separates the inward flow chamber from a radially adjacent innermost flow chamber,
wherein the second separating wall is located radially inward of the axially extending surface portion of the second step,
wherein location of the axially extending surface portion of the second step causes coolant to be diverted into the inward flow chamber.

11. The apparatus according to claim 6
wherein the coolant cavity includes a first channel corresponding to a first inlet port,
wherein the coolant cavity includes an arcuate section adjacent to the first channel,
wherein the arcuate section includes an annularly extending inner wall and an annularly extending outer wall,
wherein the arcuate section includes a flow chamber, wherein the flow chamber is radially inwardly bounded by the inner wall and radially outwardly bounded by the outer wall, wherein the flow chamber includes arcuately spaced portions separated by weir walls,
wherein each weir wall radially extends from the inner wall to the outer wall,
wherein each weir wall axially extends a first distance,
wherein the flow chamber includes plural sets of pin projections,
wherein each respective set includes a same total amount of pin projections,
wherein the pin projections in a set are substantially radially aligned,
wherein each pin projection axially extends a second distance,
wherein the second distance is greater than the first distance,
wherein each respective spaced portion includes a respective set,
wherein first alternating spaced portions include only complete pin projections,
wherein second alternating spaced portions include both complete pin projections and partial pin projections,
wherein the complete pin projections in the second alternating spaced portions are displaced radially relative to the pin projections in the first alternating spaced portions,
wherein each second alternating spaced portion includes both partial pin projections formed in the inner wall and partial pin projections formed in the outer wall.

12. The apparatus according to claim 6 wherein the disc comprises an annular wear plate.

13. Apparatus comprising:
a liquid-cooled brake component,
wherein the brake component includes an annular base,
wherein the brake component includes a disc,
wherein the disc is in operative connection with the base,
wherein the disc is coaxial with the base,
wherein the disc includes an outer surface and an inner surface,
wherein the outer surface is configured to operatively engage a rotatable disc member so as to retard rotational movement thereof,
wherein the brake component includes a coolant cavity that extends between the inner surface and the base,
wherein the coolant cavity includes at least one radially extending coolant flow channel,
wherein the at least one radially extending coolant flow channel includes a first channel,
wherein the first channel is bordered by a stepped portion of the base,
wherein the stepped portion includes at least one step formed in the base,
wherein the at least one step includes a first step,
wherein the first step includes a radially extending surface portion and an axially extending surface portion,
wherein the first channel includes a radially extending outermost coolant area that includes a maximum axial depth comprising a first axial depth,
wherein the outermost coolant area is radially inwardly bounded at least in part by the axially extending surface portion of the first step,
wherein the first channel includes a radially extending inward coolant area that includes a maximum axial depth comprising a second axial depth,
wherein the inward coolant area is radially inward of the outermost coolant area,
wherein the inward coolant area is radially adjacent to the outermost coolant area,
wherein the inward coolant area is axially bounded at least in part by the radially extending surface portion of the first step,
wherein the second axial depth is less than the first axial depth,
wherein the coolant cavity includes adjacent arcuate sections separated by the first channel,
wherein inlet coolant received into the first channel is free to flow into both arcuate sections,
wherein each arcuate section includes an annularly extending separating wall that separates an outermost flow chamber from an adjacent inward flow chamber,
wherein the inward flow chamber is radially inward of the outermost flow chamber,
wherein the outermost flow chamber includes a maximum axial depth that is less than the second axial depth,
wherein the inward flow chamber includes a maximum axial depth that is less than the second axial depth,
wherein the separating wall is located radially inward of the axially extending surface portion of the first step,
wherein location of the axially extending surface portion of the first step causes an amount of inlet coolant flowing into the first channel to be diverted into the outermost flow chambers of the adjacent arcuate sections,
wherein the amount diverted is within a predetermined percentage range of the inlet coolant flowing into the first channel.

14. The apparatus according to claim 13
wherein the coolant cavity includes a total of four coolant ports,
wherein the four coolant ports include a pair of the coolant inlet ports spaced apart approximately 180°,
wherein the four coolant ports include a pair of the coolant outlet ports spaced apart approximately 180°,
wherein each coolant outlet port is spaced approximately 90° from each coolant inlet port,
wherein each respective coolant port is in substantially radially aligned flow communication with a respectively corresponding radially extending channel,
wherein a first coolant inlet port is in substantially radially aligned flow communication with the first channel.

15. The apparatus according to claim 14
wherein each channel is bordered by a stepped portion of the base,
wherein each stepped portion includes the first step.

16. The apparatus according to claim 13
wherein the at least one step includes a second step,
wherein the second step includes a radially extending surface portion and an axially extending surface portion,
wherein the first channel includes a radially extending innermost coolant area that includes a maximum axial depth comprising a third axial depth, wherein the innermost coolant area is radially inward of the inward coolant area,
wherein the innermost coolant area is radially adjacent to the inward coolant area,
wherein the innermost coolant area is axially bounded at least in part by the radially extending surface portion of the second step,
wherein the third axial depth is less than the second axial depth.

17. The apparatus according to claim 16
wherein each arcuate section includes an annularly extending second separating wall,
wherein the second separating wall separates the inward flow chamber from a radially adjacent innermost flow chamber,
wherein the second separating wall is located radially inward of the axially extending surface portion of the second step,
wherein location of the axially extending surface portion of the second step is operative to cause coolant to be diverted into the inward flow chamber.

18. The apparatus according to claim 13 wherein the amount diverted into the outermost flow chambers of the adjacent arcuate sections is greater than ⅓ of the total amount of inlet coolant flowing into the first channel.

19. The apparatus according to claim 13 wherein the disc comprises an annular wear plate.

20. The apparatus according to claim 13 wherein each outermost flow chamber is radially inwardly bounded by a respective first separating wall and radially outwardly bounded by an outer wall of the coolant cavity,
wherein each outermost flow chamber includes arcuately spaced portions separated by weir walls,
wherein each weir wall radially extends from the first separating wall to the outer wall,
wherein each weir wall axially extends a first distance,
wherein each outermost flow chamber includes plural sets of pin projections,
wherein each respective set includes a same total amount of pin projections,
wherein the pin projections in a set are substantially radially aligned,
wherein each pin projection axially extends a second distance,
wherein the second distance is greater than the first distance,
wherein each respective spaced portion includes a respective set,
wherein first alternating spaced portions include only complete pin projections,
wherein second alternating spaced portions include both complete pin projections and partial pin projections,
wherein the complete pin projections in the second alternating spaced portions are displaced radially relative to the pin projections in the first alternating spaced portions,
wherein each second alternating spaced portion includes both partial pin projections formed in the first separating wall and partial pin projections formed in the outer wall.

\* \* \* \* \*